3,036,996
CURED POLYETHERURETHANES
Irving C. Kogon, Wilmington, Del., assignor to E. I. du Pont de Nemours and Company, Wilmington, Del., a corporation of Delaware
No Drawing. Filed Feb. 1, 1961, Ser. No. 86,328
12 Claims. (Cl. 260—77.5)

This invention relates to a novel cured polyurethane polymer and more particularly to a polyurethane polymer prepared from an organic polyisocyanate, a polyether polyol, 1,4-di(β-hydroxyethylmercapto)-2,3,5,6-tetrachlorobenzene, an arylene diamine and, optionally, an aliphatic polyol.

It is an object of the present invention to provide a novel cured polyurethane polymer. A further object is to provied a cured polyurethane polymer having excellent tear strength and which exhibits a low compression set. A still further object is to provide a process for preparing such a polyurethane polymer. Other objects will appear hereinafter.

These and other objects of this invention are accomplished by providing a solid polyurethane polymer prepared from (1) an organic polyisocyanate, (2) a polyether polyol having a number average molecular weight between about 500 and 10,000, (3) 1,4-di(β-hydroxyethylmercapto)-2,3,5,6-tetrachlorobenzene, (4) an arylene diamine and, optionally, (5) an aliphatic polyol having a number average molecular weight between about 62 and 350; there being about 0.95 to 1.1 —NCO groups for each —OH group and about 0.5 to 1.0 —NCO group for each —NH$_2$ group; the value of the molar ratio of tetrachlorobenzene to arylene diamine ranging between about 0.3:1 and 5:1 with about 30 to 80 percent by weight of said polyurethane polymer being derived from said polyether polyol and about 2 to 20 percent by weight of said polyurethane polymer being derived from said tetrachlorobenzene. The essence of the present invention resides in the use of the combination of 1,4-di(β-hydroxyethylmercapto)-2,3,5,6-tetrachlorobenzene and an arylene diamine as a curing agent for a polyurethane polymer which is prepared from an organic polyisocyanate, a polyether polyol and, if desired, a relatively low molecular weight aliphatic polyol compound. By employing this combination of the tetrachlorobenzene and an arylene diamine as a curing agent, it is possible to obtain a cured polyurethane polymer which exhibits a remarkable combination of superior tear strength and low compression set.

The compound, 1,4-di(β-hydroxyethylmercapto)-2,3,5,6-tetrachlorobenzene, is described in "Journal of Organic Chemistry," vol. 24, February 1959, pages 235–237, may be represented by the structural formula

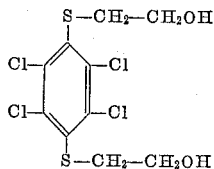

The preferred arylene diamines which may be employed in the present invention may be represented by the structural formula

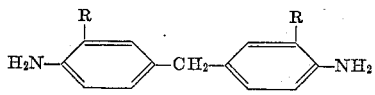

wherein R is selected from the group consisting of halogen, alkyl and lower alkoxy. The halogen radicals include chlorine, bromine, fluorine and iodine with chlorine being preferred. The number of carbon atoms present in the alkyl radical is not critical, however, the preferred alkyl radicals contain not more than about 8 carbon atoms. Representative preferred arylene diamines are 4,4'-methylenebis(2-chloroaniline);
4,4'-methylenebis(2-bromoaniline);
4,4'-methylenebis(2-iodoaniline);
4,4'-methylenebis(2-fluoroaniline);
4,4'-methylenebis(2-methoxyaniline);
4,4'-methylenebis(2-ethoxyaniline);
4,4'-methylenebis(2-methylaniline);
4,4'-methylenebis(2-ethylaniline);
4,4'-methylenebis(2-isopropylaniline);
4,4'-methylenebis(2-n-butylaniline); and
4,4'-methylenebis(2-n-octylaniline).

Other arylene diamines which may be used include compounds such as:

bis(4-aminophenyl)sulfone;
bis(4-aminophenyl)disulfide;
toluene-2,4-diamine;
1,5-naphthalenediamine;
cumene-2,4-diamine;
4-methoxy-1,3-phenylenediamine;
1,3-phenylenediamine;
4-chloro-1,3-phenylenediamine;
4-bromo-1,3-phenylenediamine;
4-ethoxy-1,3-phenylenediamine;
2,4'-diaminodiphenylether;
5,6-dimethyl-1,3-phenylenediamine;
2,4-dimethyl-1,3-phenylenediamine;
4,4'-diaminodiphenylether;
benzidine;
4,6-dimethyl-1,3-phenylenediamine;
4,4'-methylenebisaniline;
9,10-anthracenediamine;
4,4'-diaminodibenzyl;
2,4-diaminostilbene;
1,4-anthradiamine;
2,5-fluorenediamine;
1,8-naphthalenediamine;
2,6-diaminobenzfuran;
3,3'-biphenyldiamine;
2-methylbenzidine;
2,2'-dimethylbenzidine;
3,3'-dimethylbenzidine;
2,2'-dichloro-3,3'-dimethylbenzidine;
5,5'-dibromo-3,3'-dimethylbenzidine;
2,2'-dichlorobenzidine;
2,2'-dimethoxybenzidine;
3,3'-dimethoxybenzidine;
2,2'5,5'-tetramethylbenzidine;
2,2'-dichloro-5,5'-diethoxybenzidine;
2,2'-difluorobenzidine;
3,3'-difluorobenzidine;
3-ethoxybenzidine;
3-ethyl-3'-methylbenzidine;
2,2',6,6'-tetrachlorobenzidine;
3,3',5,5'-tetraiodobenzidine;
3,3'5,5'-tetraiodobenzidine;
3-trifluoromethylbenzidine; and
2-iodobenzidine.

The novel polyurethane polymers of the present invention can be prepared by a number of procedures including either sequential or simultaneous mixing of the reactants described above in accordance with the above-defined proportions. Thus, these polyurethane polymers can be made by mixing together at one time the organic polyisocyanate, the polyether polyol, 1,4-di(β-hydroxyethylmercapto)-2,3,5,6-tetrachlorobenzene, the arylene diamine and, optionally, the aliphatic polyol compound and reacting the mixture thereby obtained. In a representative alternative procedure the organic polyisocyanate may be reacted with the polyether polyol so as to form an isocyanate-terminated polyurethane polymer which is then finally reacted with 1,4-di(β-hydroxyethylmercapto)- 2,3, 5,6-tetrachlorobenzene, the arylene diamine and, if desired, the aliphatic polyol. Since the reactants can be added in any order, further alternatives will be readily apparent to those skilled in the art.

In preparing the polyurethane polymers of the present invention, any of a wide variety of polyisocyanates may be employed either alone or as isomer mixtures or as mixtures of different polyisocyanates. Aromatic aliphatic and cycloaliphatic diisocyanates and combinations of these types are useful. Arylene diisocyanates, i.e. those in which each of the two isocyanate groups is attached directly to an aromatic ring, are preferred.

Representative polyisocyanate compounds include toluene-2,4-diisocyanate, 1,4-tetramethylenediisocyanate;
1,6-hexamethylenediisocyanate;
1,10-decamethylenediisocyanate;
1,5-naphthalenediisocyanate;
cumene-2,4-diisocyanate;
4-methoxy-1,3-phenylenediisocyanate;
4-chloro-1,3-phenylenediisocyanate;
4-bromo-1,3-phenylenediisocyanate;
4-ethoxy-1,3-phenylenediisocyanate;
2,4′-diisocyanatodiphenylether;
5,6-dimethyl-1,3-phenylenediisocyanate;
2,4-dimethyl-1,3-phenylenediisocyanate;
4,4′-diisocyanatodiphenylether;
benzidinediisocyanate;
4,6-dimethyl-1,3-phenylenediisocyanate;
9,10-anthracenediisocyanate;
4,4′-diisocyanatodibenzyl;
3,3′-dimethyl-4,4′-diisocyanatodiphenylmethane;
2,6-dimethyl-4,4′-diisocyanatodiphenyl;
2,4-diisocyanatostilbene;
3,3′-dimethyl-4,4′-diisocyanatodiphenyl;
3,3′-dimethoxy-4,4′-diisocyanatodiphenyl;
1,4-anthracenediisocyanate;
2,5-fluorene-diisocyanate;
1,8-naphthalenediisocyanate;
1,3-phenylene-diisocyanate;
methylenebis(4-phenylisocyanate);
2,6-diisocyanatobenzfuran;
2,4,6-toluenetriisocyanate and
2,4,4′-triisocyanatodiphenylether.

Other representative organic isocyanates include: polyisocyanates (described in U.S. 2,683,730); organic diisocyanates (described in U.S. 2,292,443); organic triisocyanates (described in U.S. 2,929,794). Mixtures of any of the foregoing organic polyisocyanates can be employed when desired.

The polyether polyol reactants should have a number average molecular weight between about 500 and 10,000. The useful polyether polyols are polyalkyleneether glycols, polyalkylene-aryleneether glycols, polyalkyleneether-thioether glycols, and polyalkylenearyleneether-thioether glycols and polyalkyleneether triols. Polyalkyleneether glycols are preferred. Mixtures of the polyols may be used when desired.

The polyalkyleneether glycols may be represented by the formula $HO(RO)_nH$ wherein R is an alkylene radical which need not necessarily be the same in each instance and $n$ is an integer. Representative glycols include polyethyleneether glycol, polypropyleneether glycol, polytrimethyleneether glycol, polytetramethyleneether glycol, polypentamethyleneether glycol, polydecamethyleneether glycol, polytetramethyleneformal glycol and poly-1,2-dimethylethyleneether glycol. Mixtures of two or more polyalkyleneether glycols may be employed if desired.

The use of polyalkyleneether glycols in the formation of polyurethane polymers is described in U.S. Patent 2,929,800.

Representative polyalkyleneether triols are made by reacting one or more alkylene oxides with one or more low molecular weight aliphatic triols. The alkylene oxides most commonly used have molecular weights between about 44 and 250. Examples include: ethylene oxide; propylene oxide; 1,2-epoxybutane; 1,2-epoxyhexane; 1,2-epoxyoctane; 1,2-epoxyhexadecane; 2,3-epoxybutane; 3,4-epoxyhexane; 1,2-epoxy-5-hexene; and 1,2-epoxy-3-butene. Ethylene and propylene oxide are preferred. In addition to mixtures of these oxides, minor proportions of alkylene oxides having cyclic substituents may be present such as styrene oxide, cyclohexene oxide, 1,2-epoxy-2-cyclohexylpropane, and α-methyl styrene oxide. The aliphatic triols most commonly used have molecular weights between about 92 and 250. Examples include glycerol; 1,2,6-hexanetriol; 1,1,1-trimethylolpropane; 1,1,1-trimethylolethane; 2,4-dimethyl-2-methylolpentanediol-1,5 and the trimethylether of sorbitol. Representative examples of the polyalkyleneether triols include: polypropyleneether triol (M.W. 700) made by reacting 608 parts of 1,2-propyleneoxide with 92 parts of glycerine; polypropyleneether triol (M.W. 1535) made by reacting 1401 parts of 1,2-propyleneoxide with 134 parts of trimethylolpropane; polypropyleneether triol (M.W. 2500) made by reacting 2366 parts of 1,2-propyleneoxide with 134 parts of 1,2,6-hexanetriol; and polypropyleneether triol (M.W. 6000) made by reacting 5866 parts of 1,2-propyleneoxide with 134 parts of 1,2,6-hexanetriol. Further examples of these polyalkyleneether triols are given in U.S. Patent 2,866,774.

The polyalkylene-aryleneether glycols are similar to the polyalkyleneether glycols except that some arylene radicals are present. Representative arylene radicals include phenylene, naphthalene and anthracene radicals which may be substituted with various substituents, such as alkyl groups. In general, in these glycols there should be at least one alkyleneether radical having a molecular weight of about 500 for each arylene radical which is present. Polyurethane polymers prepared from these polyalkylene-aryleneether glycols are described in U.S. Patent 2,843,568.

The polyalkyleneether-thioether glycols and the polyalkylene-aryleneether glycols are similar to the above-described polyether glycols except that some of the ether-oxygen atoms are replaced by sulfur atoms. These glycols may be conveniently prepared by condensing together various glycols, such as thiodiglycol, in the presence of a catalyst, such as p-toluene-sulfonic acid. The use of these glycols in the formation of polyurethane polymers is described in U.S. Patent 2,900,368.

The aliphatic polyols which may optionally be employed in preparing the novel polyurethane polymers of this invention should have a number average molecular weight ranging from about 62 to 350. Representative glycols include ethylene glycol;
propylene glycol;
trimethylene glycol;
1,2-butylene glycol;
1,3-butanediol;
1,4-butanediol;
1,5-pentanediol;
1,2-hexylene glycol;
1,10-decanediol;
1,2-cyclohexanediol;
2-butene-1,4-diol;
3-cyclohexene-1,1-dimethanol;
4-methyl-3-cyclohexene-1,1-dimethanol and
3-methylene-1,5-pentanediol.

Further examples of aliphatic polyols include alkylene oxide modified diols such as diethylene glycol;
(2-hydroxyethoxy)-1-propanol;
4-(2-hydroxyethoxy)-1-butanol;
5-(2-hydroxyethoxy)-1-pentanol;
3-(2-hydroxypropoxy)-1-propanol;
4-(2-hydroxypropoxy)-1-butanol;
5-(2-hydroxypropoxy)-1-pentanol;
1-(2-hydroxyethoxy)-2-butanol;
1-(2-hydroxyethoxy)-2-pentanol;
1-(2-hydroxymethoxy)-2-hexanol;
1-(2-hydroxyethoxy)-2-octanol;
1-(2-hydroxypropoxy)-2-butanol;
1-(2-hydroxypropoxy)-2-propanol;
1-(2-hydroxypropoxy)-2-hexanol and
1-(2-hydroxypropoxy)-2-octanol.

Representative examples of ethylenically unsaturated low molecular weight diols include 3-allyloxy-1,5-pentanediol;
3-allyloxy-1,2-propanediol;
2-allyloxymethyl-2-methyl-1,3-propanediol;
2-methyl-2-[(4-pentenyloxy)methyl]-1,3-propanediol; and
3-(o-propenylphenoxy)-1,2-propanediol;

others are listed in U.S. 2,927,098, 2,854,486. Representative examples of low molecular weight polyols having at least 3 hydroxyl groups include:

glycerol;
1,2,6-hexanetriol;
1,1,1-trimethylolpropane;
1,1,1-trimethylolethane;
pentaerythritol;
3-(2-hydroxyethoxy)-1,2-propanediol;
3-(2-hydroxypropoxy)-1,2-propanediol,
6-(2-hydroxyethoxy)-1,2-hexanediol,
6-(2-hydroxypropoxy)-1,2-hexanediol;
2,4-dimethyl-2-(2-hydroxyethoxy)methylpentanediol-1,5;

mannitol; galactitol; talitol; iditol; allitol; altritol; gulitol; arabitol; ribitol; xylitol; lyxitol; erythritol; threitol; 1,2,5,6-tetrahydroxyhexane; meso-inositol; sucrose; glucose; galactose; mannose; fructose; xylose; arabinose; dihydroxyacetone; glucose-$\alpha$-methylglucoside; 1,1,1-tris-[(2-hydroxyethoxy)methyl]ethane and 1,1,1-tris[(2-hydroxypropoxy)methyl]propane. Other examples are included in U.S. 2,917,468.

In preparing the novel polyurethane polymers of this invention, the proportions of reactants should be so selected to provide about 0.95 to 1.1 —NCO groups for each —OH group and about 0.5 to 1 additional —NCO group for each —NH$_2$ group. Frequently, the overall value of the molar ratio of —NCO groups to the sum of —OH groups and the —NH$_2$ groups ranges between about 0.95:1 and 1.1:1. The amount of the tetrachlorobenzene compound employed in relation to the amount of the arylene diamine employed should range on a molar ratio basis from 0.3:1 to 5:1. The polyurethanes exhibit less satisfactory properties when proportions other than those specified above are employed.

In order that these polyurethane polymers have satisfactory elastomeric qualities, about 30 to 80 percent by weight of the polymer should be derived from the polyether polyol. Values ranging between about 55 and 70 percent by weight are preferred. To obtain the proper balance of elasticity with the other properties, the proportion of the tetrachlorobenzene compound incorporated into the polyurethane polymer should range from about 2 to 20 percent by weight. Values ranging between about 4 and 15 percent by weight are preferred.

When preparing the polyurethane polymers of this invention, it is desirable to maintain homogeneity with the reactants from the time when they are mixed to the time when they have completely reacted to form the final cured polymer. Those skilled in the art can readily select mixing times and reaction temperatures suitable for this purpose. In general, when the polyurethanes are prepared by the simultaneous mixing of all of the reactants, temperatures of from about 100 to 160° C. may be employed over a period of time of from about 5 to 180 minutes. Temperatures between about 100 and 150 C. are convenient to use when the tetrachlorobenzene compound, either alone or in admixture with the arylene diamine compound, is added to a fluid isocyanate-terminated polyurethane prepared by reacting the organic polyisocyanate with the polyether polyol and, if desired, the aliphatic polyol compound. When reacting the fluid isocyanate-terminated polyurethane with the arylene diamine compound in the absence of the tetrachlorobenzene compound, temperatures ranging from 25° to 150° C. for periods of time from about one to 24 hours may be employed with temperatures of from 70 to 100° C. for from one to 5 hours being preferred. It is readily apparent that the higher the temperature the shorter the reaction time. Since organic polyisocyanates are more reactive toward the arylene diamine compound (particularly when the diamine has no ortho substituents) than they are toward the tetrachlorobenzene compound, it is preferred that the tetrachlorobenzene compound be added before or at the same time as the arylene diamine compound.

After all the reactants have been mixed, either simultaneously or sequentially, it is generally desirable to deaerate the mixture at temperatures of from about 100 to 160° C. The fluid composition which is obtained by mixing the reactants eventually changes to a non-plastic, cured solid. The temperature must be high enough during this period to prevent phase separation in the reaction mass. Operating convenience will determine how much higher the temperature can be. The higher the temperature, the shorter will be the pot life of the fluid composition and the total reaction time. The incorporation of catalysts for urethane formation, such as triethylamine metal carboxylates (e.g. lead naphthenate), diethylcyclohexylamine, or ferric acetyl acetonate decreases the pot life and total reaction time without affecting the quality of the ultimate cured polyurethane. Those skilled in the art can readily determine the pot life and the reaction conditions for a particular composition by empirical means. Representative reaction times (often called cure times because a vulcanizate results) include: 20 hrs./105° C. (uncatalyzed), 4 hrs./105° C. (catalyzed), 10 min./121° C. (catalyzed). If desired, conventional pressures (e.g. 400–600 p.s.i.) may be applied during the molding of films and the like.

As noted above, the cured polyurethane polymers of this invention may be prepared by mixing the 1,4-di($\beta$-hydroxyethylmercapto) - 2,3,5,6 - tetrachlorobenzene and arylene diamine with an already formed isocyanate-terminated polyurethane prepared by reacting the organic polyisocyanate with the polyether polyol and, optionally, the aliphatic polyol compound. If desired, the polyether polyol and the aliphatic polyol can be employed as a mixture although it is to be understood that some or all of them may be separately reacted and the products obtained blended to give the desired fluid isocyanate-terminated polyurethane composition. Agitation is normally used to provide thorough mixing of the reactants and to aid in the temperature control. The reaction is carried out at a temperature between about 25 and 150° C. for a period of from ½ to several hours. In general, it is preferred to carry out the reaction at 80° C. for a period of about 4 hours. It is to be understood that the lower temperatures require longer reaction times and at temperatures higher than about 100° C. an isocyanate-terminated composition of increased viscosity is obtained. If desired, the reaction may be carried out in more than one step. Thus, a hydroxyl-terminated polyurethane may be made by reacting the organic polyisocyanate with a molar excess of one or both of the polyols. This polyurethane in turn may then be reacted with additional organic polyisocyanate or isocyanate-terminated polyurethane.

The cured polyurethane polymers of this invention may be prepared by carrying out part or all of the reaction between the above-described reactants in an inert solvent. The cured polyurethane may be isolated from the solvent by conventional mechanical means such as spray drying, drum drying, or evaporation. The solvent should be free from groups containing Zerewitinoff active hydrogen atoms

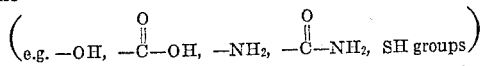

Representative examples of suitable solvents include lower dialkyl ketones (such as methyl isobutyl ketone), lower alkyl esters (such as ethyl acetate), aromatic hydrocarbons (such as toluene and xylene), aliphatic hydrocarbons (such as hexane), chlorinated hydrocarbons (such as trichloro or tetrachloroethylene), cyclic ethers (such as tetrahydrofuran). Those skilled in the art can readily select the solids content which will depend on operating convenience.

The cured polyurethane polymers of this invention have many varied applications. They are particularly useful for machine parts, potting and incapsulation of electronic equipment, and as a metal replacement. Among the many articles and uses to which these cured products are applicable may be mentioned the following: solid tires; mechanical goods, molded, lathe cut, stamped out, cast or dipped, such as grommets, sealing rings, channel rubbers, packing gaskets, mountings, matting (floor covering), tile, rolls, oil-well swabs, pipe-wipers, slush pump pistons, packers, tractor cleats, tank tread blocks, etc.; footwear, heels; coated fabrics of cotton, glass fibers, rayon, wool, polyacrylonitrile, polyester fibers, leather, paper, plastics; films in the form of sheeting, wrapping film, etc.; coating compositions for wood, metal, plastic, concrete, brick, ceramics, leather, etc.; cellular products which may be self-blown or expanded with a blowing agent for use as vibration dampers or shock absorbers.

The following examples will better illustrate the nature of the present invention; however, the invention is not intended to be limited to these examples. Parts are by weight unless otherwise indicated.

POLYMER A

Toluene-2,4-diisocyanate (278.7 grams, 1.6 moles) and anhydrous polytetramethyleneether glycol (number average molecular weight 1000) (1000 grams, 1.0 mole) were agitated at 80° C. for 4 hours in a dry reaction vessel protected from atmospheric moisture. Polymer A thus obtained had a free —NCO group content of 4.2%, a Brookfield viscosity at 30° C. of about 16,500 c.p.s., and a number average molecular weight of about 2000.

POLYMER B

Toluene-2,4-diisocyanate (348.4 grams) and anhydrous polytetramethyleneether glycol having a number average molecular weight of 1000 (1000 grams) are agitated at 80° C. for 4 hours in a dry reaction vessel protected from atmospheric moisture. Polymer B thus obtained has a free —NCO group content of 6.4%, a Brookfield viscosity at 30° C. of 6000 to 7000 c.p.s., and a number average molecular weight of about 1310.

Vulcanizate properties were measured at the temperatures indicated in accordance with the following procedures:

| | ASTM Method |
|---|---|
| Shore A hardness (25° C.) | D676–58T. |
| Compression set (22 hrs., 70° C.) | D395–55 Method B. |
| Yerzley resilience (25° C.) | D945–55. |
| Rebound resilience (25° C.) | D1054. |
| Tear resistance (25° C.) | D624. |

The modulus at 300% extension ($M_{300}$), tensile strength at the break ($T_B$), and the percent extension at the break ($E_B$) were measured on Scott dumbbells (ASTM Test Method D412–51T) with an Instron testing machine set at a crosshead speed of 10 inches/min. and a load of 100 pounds.

*Example 1*

A mixture consisting of Polymer A (50 grams), 1,4-di(β-hydroxyethylmercapto) - 2,3,5,6-tetrachlorobenzene, (4.6 grams), and 4,4'-methylenebis(2-chloroaniline) (3.55 grams) was heated at 125° C. and deaerated until a clear solution was obtained. This solution was poured into an open mold and cured at 105° C. for 20 hours. The vulcanizate exhibited the following properties:

| | | |
|---|---|---|
| $M_{300}$ | lb./sq. in. | 1230 |
| $E_B$ | percent | 650 |
| $T_B$ | lb./sq. in. | 3000 |
| Shore A hardness | | 88 |
| Yerzley resilience | percent | 69 |
| Compression set | do | 29 |
| Rebound resilience | do | 46 |
| Tear strength | lb./in. | 175 |

The polytetramethyleneether glycol units comprised about 67.3% by weight and the 1,4-di(β-hydroxyethylmercapto-2,3,5,6-tetrachlorobenzene units about 7.9% by weight of the vulcanizate. The value of the molar ratio of the tetrachlorobenzene to the arylene diamine was 0.94:1. The value of the molar ratio of —NCO group/(—NH₂ group+—OH group) was 0.965:1.

*Example 2*

A mixture consisting of polymer A (50 grams), 1,4-di-(β-hydroxyethylmercapto) - 2,3,5,6 - tetrachlorobenzene, (2.4 grams), and 4,4'-methylenebis(2-chloroaniline) (5.25 grams) was heated and deaerated at 125° C. until a clear mixture was obtained. This mixture was poured into an open hot mold and cured at 120° C. for 24 hours. The vulcanizate exhibited the following properties:

| | | |
|---|---|---|
| $M_{300}$ | lb./sq. in. | 1460 |
| $E_B$ | percent | 540 |
| $T_B$ | lb./sq. in. | 3600 |
| Shore A hardness | | 89 |
| Compression set | percent | 28 |
| Yerzley resilience | do | 65 |
| Tear strength | lb./in. | 130 |

The polytetramethyleneether glycol units comprised about 67.9% by weight and the 1,4-di(β-hydroxyethylmercapto)-2,3,5,6-tetrachlorobenzene units about 4.2% by weight of the vulcanizate. The value of the molar ratio of the tetrachlorobenzene compound to the arylene diamine was 0.33:1. The value of the molar ratio of —NCO group/(—NH₂ group+—OH group) was 0.96:1.

*Example 3*

A mixture consisting of Polymer B (60 grams), 1,4-di-(β-hydroxyethylmercapto) - 2,3,5,6 - tetrachlorobenzene (7.0 grams), and 4,4'-methylenebis(2-chloroaniline) (5.0 grams) was heated and deaerated at 125° C. until a clear mixture was obtained. This mixture was then poured into an open hot mold and cured at 105° C. for 24 hours. The vulcanizate exhibited the following properties:

| | | |
|---|---|---|
| $M_{300}$ | lb./sq. in. | 2250 |
| $E_B$ | percent | 350 |
| $T_B$ | lb./sq. in. | 2700 |
| Shore A hardness | | 92 |
| Compression set | percent | 25 |
| Rebound resilience | do | 37 |
| Tear strength | lb./in. | 200 |

The polytetramethyleneether glycol units comprised about 59.9% by weight and the 1,4-di(β-hydroxyethylmercapto)-2,3,5,6-tetrachlorobenzene units about 11.3% by weight of the vulcanizate. The value of the molar ratio of the tetrachlorobenzene compound to the arylene diamine was 1:1. The value of the molar ratio of —NCO group/(—NH₂ group+—OH group) was 0.97:1.

*Example 4*

A mixture consisting of Polymer A (50 grams), 1,4-di-(β-hydroxyethylmercapto) - 2,3,5,6 - tetrachlorobenzene (7.56 grams) and 4,4'-methylenebis(2-chloroaniline) (1.42 grams) was heated and deaerated at 125° C. until a clear mixture was obtained. This mixture was then poured into an open hot mold and cured at 100° C. for 20 hours. The vulcanizate exhibited the following properties:

M₃₀₀ ----------------------------lb./sq. in__ 1030
E_B ------------------------------percent__ 615
T_B ------------------------------lb./sq. in__ 3900
Shore A hardness_____ 85
Compression set_____percent__ 40
Tear strength_____lb./in__ 160

The polytetramethyleneether glycol units comprised about 66.2% by weight and the 1,4-di(β-hydroxyethylmercapto)-2,3,5,6-tetrachlorobenzene units about 12.8% by weight of the vulcanizate. The value of the molar ratio of the tetrachlorobenzene compound to the arylene diamine was 3.86:1. The value of the molar ratio of —NCO group/(—NH₂ group+—OH group) was 0.96:1.

As many widely different embodiments of this invention may be made without departing from the spirit and scope thereof, it is to be understood that this invention is not limited to the specific embodiments thereof except as defined in the appended claims.

What is claimed is:

1. A polyurethane polymer prepared from (1) an organic polyisocyanate, (2) a polyether polyol having a number average molecular weight between about 500 and 10,000, (3) 1,4-di(β-hydroxyethylmercapto)2,3,5,6-tetrachlorobenzene, and (4) an arylene diamine; there being about 0.95 to 1.1 —NCO groups for each —OH group and about 0.5 to 1.0 —NCO group for each —NH₂ group; the value of the molar ratio of tetrachlorobenzene to arylene diamine ranging between about 0.3:1 and 5:1 with about 30 to 80 percent by weight of said polyurethane polymer being derived from said polyether polyol and about 2 to 20 percent by weight of said polyurethane polymer being derived from said tetrachlorobenzene.

2. A polyurethane polymer prepared from (1) an organic polyisocyanate, (2) a polyether polyol having a number average molecular weight between about 500 and 10,000, (3) 1,4-di(β-hydroxyethylmercapto)-2,3,5,6-tetrachlorobenzene, (4) an arylene diamine and (5) an aliphatic polyol having a number average molecular weight between about 62 and 350; there being about 0.95 to 1.1 —NCO groups for each —OH group and about 0.5 to 1.0 —NCO group for each —NH₂ group; the value of the molar ratio of tetrachlorobenzene to arylene diamine ranging between about 0.3:1 and 5:1 with about 30 to 80 percent by weight of said polyurethane polymer being derived from said polyether polyol and about 2 to 20 percent by weight of said polyurethane polymer being derived from said tetrachlorobenzene.

3. A polyurethane polymer prepared from (1) an organic polyisocyanate, (2) a polyether glycol having a number average molecular weight between about 500 and 10,000, (3) 1,4-di(β-hydroxyethylmercapto)-2,3,5,6-tetrachlorobenzene and (4) an arylene diamine having the formula

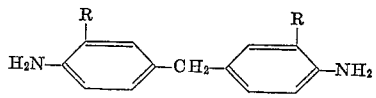

wherein R is selected from the group consisting of halogen, alkyl and methoxy; the value of the molar ratio of —NCO groups to the total number of —OH groups and —NH₂ groups ranging between about 0.95:1 and 1.1:1, the value of the molar ratio of tetrachlorobenzene to arylene diamine ranging between about 0.3:1 and 5:1 with about 30 to 80 percent by weight of said polyurethane polymer being derived from said polyether glycol and about 2 to 20 percent by weight of said polyurethane polymer being derived from said tetrachlorobenzene.

4. A polyurethane polymer prepared from (1) an organic polyisocyanate, (2) a polyether glycol having a number average molecular weight between about 500 and 10,000, (3) 1,4 - di(β - hydroxyethylmercapto) - 2,3,5,6-tetrachlorobenzene, (4) an arylene diamine having the formula

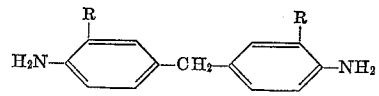

wherein R is selected from the group consisting of halogen, alkyl and methoxy, and (5) an aliphatic polyol having a number average molecular weight between about 62 and 350; the value of the molar ratio of —NCO groups to the total number of —OH groups and —NH₂ groups ranging between about 0.95:1 and 1.1:1; the value of the molar ratio of tetrachlorobenzene to arylene diamine ranging between about 0.3:1 and 5:1 with about 30 to 80 percent by weight of said polyurethane polymer being derived from said polyether glycol and about 2 to 20 percent by weight of said polyurethane polymer being derived from said tetrachlorobenzene.

5. A polyurethane polymer according to claim 3 wherein the organic polyisocyanate is toluene-2,4-diisocyanate and the polyether glycol is a polyalkylene-ether glycol.

6. A polyurethane polymer according to claim 5 wherein the polyalkyleneether glycol is a polytetramethyleneether glycol having a number average molecular weight of about 1000 and the arylene diamine is 4,4'-methylenebis(2-chloroaniline).

7. A polyurethane polymer according to claim 4 wherein the organic polyisocyanate is toluene-2,4-diisocyanate, the polyether glycol is a polytetramethyleneether glycol having a number average molecular weight of about 1000 and the aliphatic polyol is 1,3-butanediol.

8. A polyurethane polymer according to claim 4 wherein the organic polyisocyanate is toluene-2,4-diisocyanate, the polyether glycol is a polytetramethyleneether glycol having a number average molecular weight of about 1000 and the aliphatic polyol is 1,2,6-hexanetriol.

9. A cured polyurethane polymer obtained by reacting an isocyanate-terminated polyurethane polymer with 1,4-di(β - hydroxyethylmercapto) - 2,3,5,6 - tetrachlorobenzene and an arylene diamine having the formula

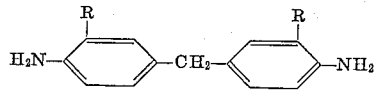

wherein R is selected from the group consisting of halogen, alkyl and methoxy, said isocyanate-terminated polyurethane polymer being prepared by reacting an organic polyisocyanate with a polyether glycol having a number average molecular weight between 500 and 10,000; the value of the molar ratio of —NCO groups to the total number of —OH groups and —NH₂ groups in said cured polyurethane polymer ranging between about 0.95:1 and 1.1:1; the value of the molar ratio of said tetrachlorobenzene to said arylene diamine in said polyurethane polymer ranging between about 0.3:1 and 5:1 with about 30 to 80 percent by weight of said polyurethane polymer being derived from said polyether glycol and about 2 to 20 percent by weight of said polyurethane polymer being derived from said tetrachlorobenzene.

10. A cured polyurethane polymer according to claim 9 wherein the polyether glycol is selected from the group consisting of polyalkyleneether glycols, polyalkylene-aryleneether glycols, polyalkyleneether-thioether glycols and polyalkylene-aryleneether thioether glycols.

11. A cured polyurethane polymer according to claim 9 wherein the 1,4-di(β-hydroxyethylmercapto)-2,3,5,6-tetrachlorobenzene and arylene diamine is reacted with the isocyanate-terminated polyurethane polymer at a temperature of from about 100 to 150° C.

12. A cured polyurethane polymer according to claim 9 wherein from 55 to 70 percent by weight of said polymer is derived from said polyether glycol and from 4 to 15 percent by weight of said polymer is derived from said 1,4 - di(β - hydroxyethylmercapto) - 2,3,5,6 - tetrachlorobenzene.

References Cited in the file of this patent

UNITED STATES PATENTS

| | | |
|---|---|---|
| 2,843,568 | Benning et al. | July 12, 1958 |
| 2,961,428 | Muller et al. | Nov. 22, 1960 |